May 11, 1965  W. H. GROOM  3,182,819
GROUP ASSEMBLING APPARATUS
Filed Aug. 30, 1961  4 Sheets-Sheet 1

INVENTOR.
WILLIAM H. GROOM
BY
ATTORNEYS

May 11, 1965 W. H. GROOM 3,182,819
GROUP ASSEMBLING APPARATUS
Filed Aug. 30, 1961 4 Sheets-Sheet 3

INVENTOR.
WILLIAM H. GROOM
BY
ATTORNEYS

May 11, 1965  W. H. GROOM  3,182,819
GROUP ASSEMBLING APPARATUS
Filed Aug. 30, 1961  4 Sheets-Sheet 4

INVENTOR.
WILLIAM H. GROOM
BY
ATTORNEYS

United States Patent Office 3,182,819
Patented May 11, 1965

3,182,819
GROUP ASSEMBLING APPARATUS
William H. Groom, Camp Hill, Pa., assignor to Bayuk Cigars Incorporated, Philadelphia, Pa., a corporation of Maryland
Filed Aug. 30, 1961, Ser. No. 135,057
5 Claims. (Cl. 214—6)

The invention relates to apparatus for assembling articles in desired groups while being conveyed prior to packaging or other further handling.

The presently disclosed apparatus is intended to meet needs existing particularly in the packaging of cigars and the like, and it will be described in connection with such use. It should be readily understood, however, that the invention is broadly applicable to analogous uses in which problems exist similar to those described hereafter.

In the cigar industry it is now common to sell cigars individually or in packaging units known as "five packs." It is also typical, involving the latter case, to wrap an assembled group of such five packs as a package containing, as examples, twenty, twenty-five or thirty cigars. These larger packages may either be "broken" by the dealer for sale of the five packs individually or may be sold unopened to a customer desiring that particular number of cigars. In any event, the number of individual packs initially wrapped together in a single package, and their physical arrangement as a group, may vary in dependence on various marketing factors. Therefore, the apparatus used for assembling these groups of five packs desirably should be capable of flexible operation in the sense that different numbers and physical arrangements of five packs may be effected. Using again the previous example, it should be possible to assemble the packs to result in composite packages of twenty, twenty-five or thirty cigars.

A further aspect of the problem involves the inclusion of fillers or "blanks" in packages. In assembling a given number of packs in a group to form a package having a particular shape it may be necessary, in order to obtain a neat six-sided package, to include a cardboard filler having the same dimensions as an individual pack. Flexibility in operation again is desirable in connection with the apparatus for assembling the packaging groups and introducing these cardboard fillers.

Further novel aspects of the present apparatus are involved in certain means for stacking five packs in such a manner that they drop on to the stack flatly.

Accordingly, it is an object of the invention to provide apparatus capable of assembling groups of cigar packs or the like being conveyed prior to packaging thereof, the number and physical arrangement of packs in each group being selectively variable.

It is a further object to provide apparatus having provisions for including in each assembled group a cardboard filler or the like.

Further objects and advantages will become apparent from the following description read in conjunction with the accompanying drawings, in which:

FIGURE 5 is a front elevation of the apparatus;

Figure 1:
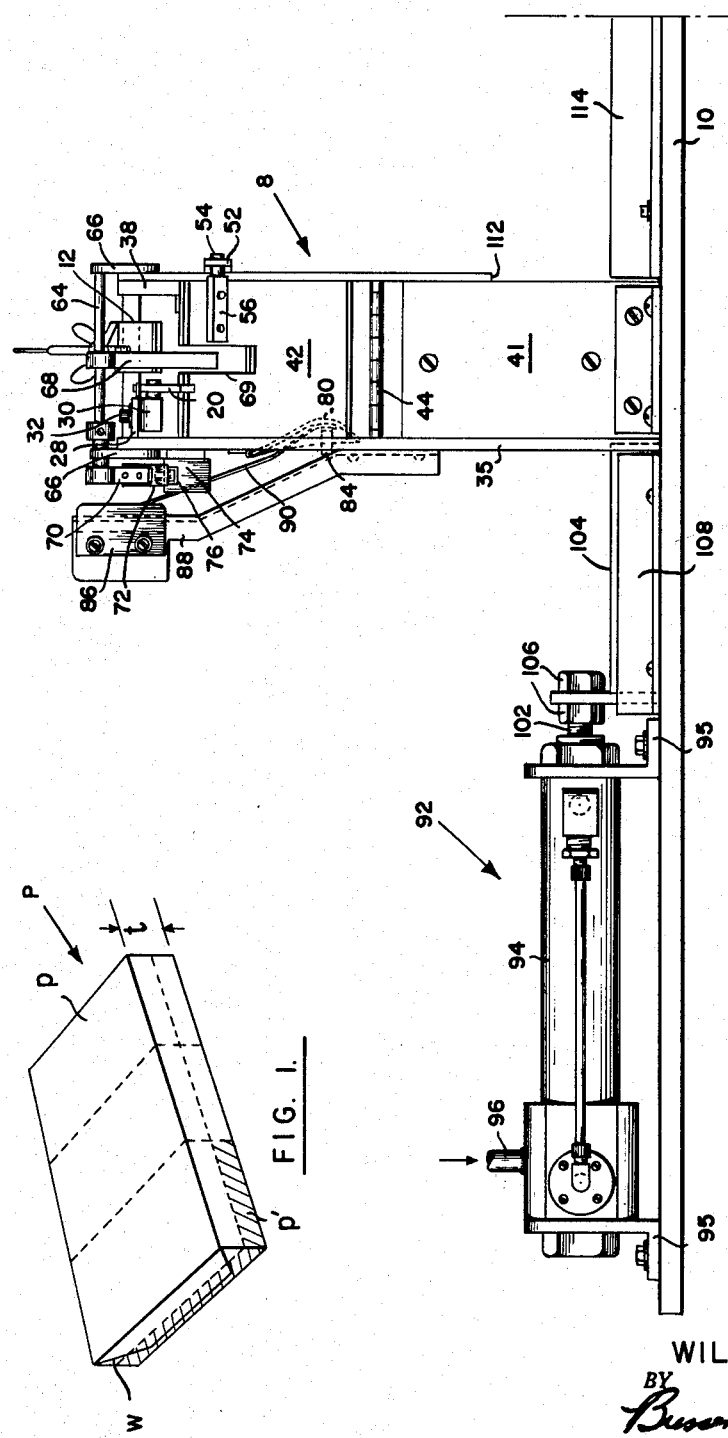
FIGURE 1 illustrates one arrangement of cigar packs in a group attainable by apparatus according to the invention.

In FIGURE 1 there is illustrated a package P comprising five individual packs $p$ and a cardboard element or the like $p'$ which will be referred to hereafter as a "filler." This package P, which typically would contain twenty-five cigars, may be wrapped with cellophane W or other wrapping material subsequent to arranging these packs in a group in accordance with the invention. As will be seen hereafter, the machine is flexible in the sense that it may be used to form packaging groups other than that illustrated in FIGURE 1. Therefore, it will be understood that description of the machine as applied to groupings such as shown in FIGURE 1 is to be limited strictly to purposes of illustration.

Figure 4:
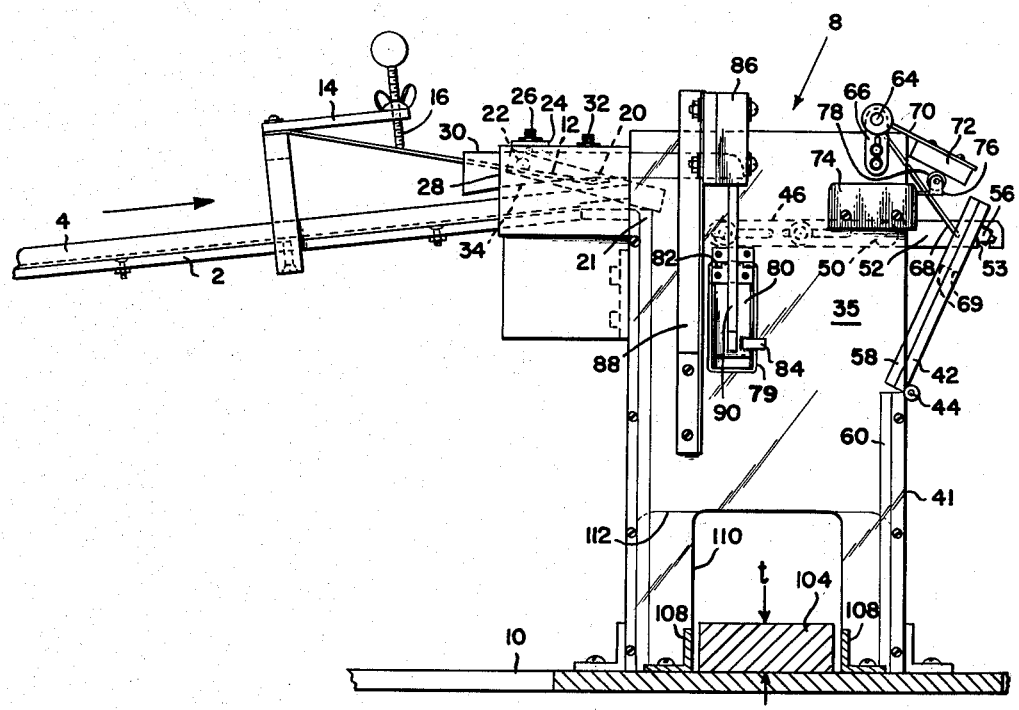
FIGURE 4 is a side elevation taken as indicated by lines 4—4 in FIGURE 3.

Individual cigar packs (referred to hereafter merely as "packs") are pushed upwardly along a ramp 2 in delivery from a conventional packaging machine, the ramp being provided with a channel guide 4 and a guide 6 adjustable transversely to accommodate packs of different widths. Referred to generally at 8 is a hopper or collator which is in the form of a plastic box resting on a table 10 and having its open upper portion disposed at the end of the ramp 2. As packs $p$ are pushed up the ramp 2 they drop into the hopper 8, and to insure that they will drop flatly various means are provided. First, a flat spring member 12 in the form of a finger is supported at one end from a bracket 14 in which an adjustable screw 16 is provided to engage and bias the member 12 downwardly. It may be noted from FIGURE 2 particularly that as a pack leaves the ramp 2 and begins to project over the open hopper 8 the spring member 12 bears downwardly against the trailing portion of this pack. A further provision includes a finger 20 pivotally connected at 22 to a plate 24 which is adjustably mounted on a bracket 28 by means of a screw 26. Also adjustably mounted on bracket 28, by means of a screw 32, is a member 30 having a concave lower face 34 as evident in FIGURE 4. Thus the spring member 12, finger 20 and member 30 act cooperatively to keep the pack $p$ in a level position even as it extends beyond the edge 21 of the ramp 2, where it normally would tend to tilt vertically.

As previously mentioned, the channel guide 6 is transversely adjustable to accommodate various sizes of packs, and similar provisions are provided in construction of the hopper 8. The hopper side wall indicated at 35 merely has the portion of its edge 36 which extends above the ramp 2 rounded as indicated. However, inside the opposite wall a removable shim 38 is provided, its forward edge also being rounded as indicated at 40. Removal of the shim 38 is effected when comparatively larger packs are to be handled in the machine.

Figure 2:
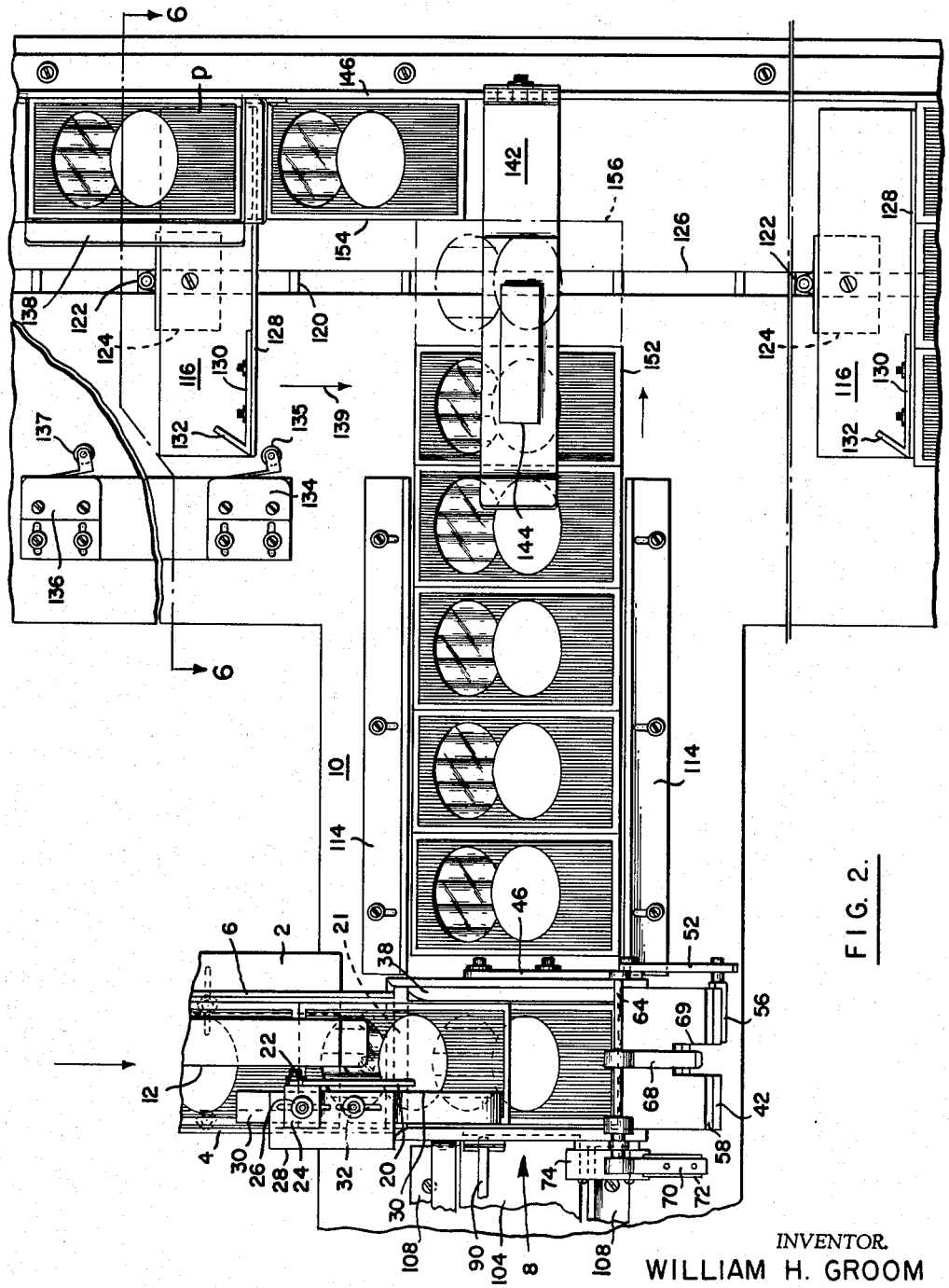
FIGURE 2 is a plan view of the apparatus while in operation to assemble groups of cigar packs.

The rear wall of the hopper 8 is in two parts, 41 and 42, the upper part 42 being connected to the lower part 41 by means of a hinge 44. Part 42 is tilted at an angle to the vertical and is adjustably held in such position by means including a link 46 connected to the side wall of the hopper 8 by screws 48. Link 46 is pivotally connected by a pin 50 to a further link 52, and link 52 has a hook portion 53 engageable over the protruding lug 54 of a member 56 secured to the hinged part 42. Thus it will be seen that by adjustment of link 46 the angular disposition of part 42 may be set as desired. A further expedient, to the end that the machine may be flexible in its handling of packs of different sizes, is found in a shim or liner member 58 overlapping the inner face of the upper wall part 42, and in a similar lower element 60. By the removal of elements 58 and 60 the hopper may be made adaptable to the handling of packs slightly longer than the packs $p$ which are shown in FIGURE 2.

A shaft 64 is rotatably journalled in members 66 secured to the hopper walls, and a rocker arm 68 is keyed to this shaft. In order to permit unobstructed rotation of arm 68 the wall parts 42 and 58 are cut away as indicated at 69. At the outer end of shaft 64 an arm 70 is keyed thereto and carries a weighted element 72. The function of element 70 is to bias to a closed position a switch 74 through means of an operating element 76 having a roller 78.

An opening 79 is provided in the side wall 35, and in this opening an element 80 is pivotally hung by means of a hinge 82. A finger-like extension 84 of element 80 limits inward pivoting movement thereof. The function of element 80 is to operate a normally open switch 86, mounted on a bracket 88, through the medium of a switch actuating arm 90.

A conventional pneumatic piston and cylinder unit is generally indicated at 92. The cylinder 94 is mounted on table 10 by brackets 95, and is connected to a source of compressed air through a conduit 96. Unit 92 is of conventional manufacture and therefore need not be described in detail. It is sufficient to note that driving motion of the piston is controlled by a valve 98 which is operated by a solenoid 100 in such a manner that energization of the solenoid causes motion of the piston to the right in FIGURE 3 and deenergization automatically effects return of the piston to the left. The rod 102 of the piston is connected to a ram 104 by bolts 106, the sides of this ram being bounded by guide channels 108. In the illustrated case the height $t$ of ram 104 corresponds approximately to the height of a package P, or the combined height of two packs $p$. In operation the ram 104 reciprocates through an opening 110 in the hopper side 35, the stroke of the piston corresponding approximately to the width of a pack $p$. By increasing the height $t$ of the ram to correspond to the overall height of three, four, five or more superposed packs, corresponding numbers thereof may be acted upon by the ram 104 to discharge them sideways through an opening 112 in the far side of the hopper.

Channel guides 114 are adjustably spaced on table 10 by a distance corresponding approximately to the length of a pack $p$, and function to maintain alignment of these packs as they are displaced from hopper 8 by ram 104. To the right in FIGURE 2 there is shown the portion of the apparatus including a plurality of pusher plates 116 which travel along a line parallel to the ramp 2. Plates 116 are carried on an endless chain generally indicated at 118. The connection between each plate 116 and the chain 118 includes chain crossbars 120 to which are welded posts 122, each post having secured thereto a plate 124 which is affixed to the plate 116. Each plate 124 has a projection 125 which is received and guided in a track provided by an elongate opening 126 extending across table 10. Each plate 116 has a portion 128 turned upwardly at a right angle to the table, and to such portion there is secured a plate 130 having an extension 132 turned backwardly as indicated in FIGURE 2. Positioned in the path of movement of pusher plates 116 are switches 134 and 136 carrying, respectively, switch actuating arms 135 and 137. As pusher plates 116 move across the table 10 in the direction indicated by arrow 139 in FIGURE 2, each upright portion 128 engages switch arms 135 and 137, and as the pusher plate passes each switch the roller on the switch actuating arm thereof is gradually released by riding gradually across the backwardly turned extension 132. A purpose of said extension 132 is to effect smooth rather than abrupt actions of switches 134 and 136.

A further hopper is indicated at 138, this hopper being positioned directly over the right-hand side of the path of movement of pusher plates 116. Hopper 138 may be filled either by hand or by automatic equipment, although for reasons appearing hereafter it may be assumed that it is hand filled. It will be noted from FIGURE 6 that in hopper 138 cigar packs $p$ containing cigars $c$ are alternate vertically with the cardboard fillers $p'$.

Figure 6:
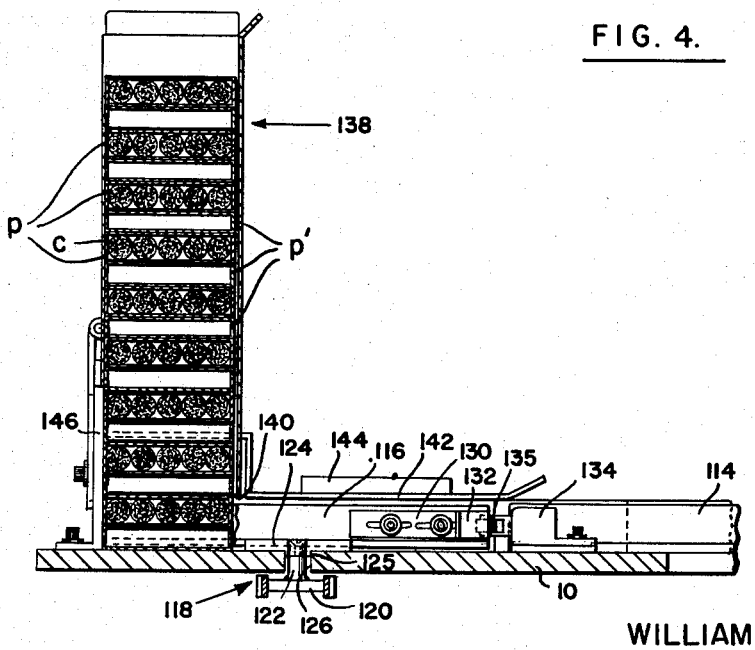
FIGURE 6 is a vertical cross-section through the portion of the apparatus as indicated by lines 6—6 in FIGURE 2.

Hopper 138 is supported at one side by a wall member 146, and as may be noted from FIGURE 6 the other side of this hopper terminates at 140 above the level of the upright portions 128 of pusher plates 116. The positioning of hopper 138 is such that as pusher plates 116 pass below it the combination of a filler $p'$ and a cigar filled pack $p$ are withdrawn from the bottom of the hopper.

A flat arm 142 is hingedly connected to the wall member 146 and is weighted by a bar 144. As ram 104 operates successively to eject packs from the hopper 8, there may be a tendency of the packs to slide, due to inertia, farther than necessary and the function of arm 142 is to exert a slight restraining action on these packs.

Beyond the arm 142, as pusher plates 116 are moving in the direction indicated by arrow 139, is a further machine for wrapping the assembled group of packs. Such further apparatus, however, forms no part of the invention.

Figures 3, 7:
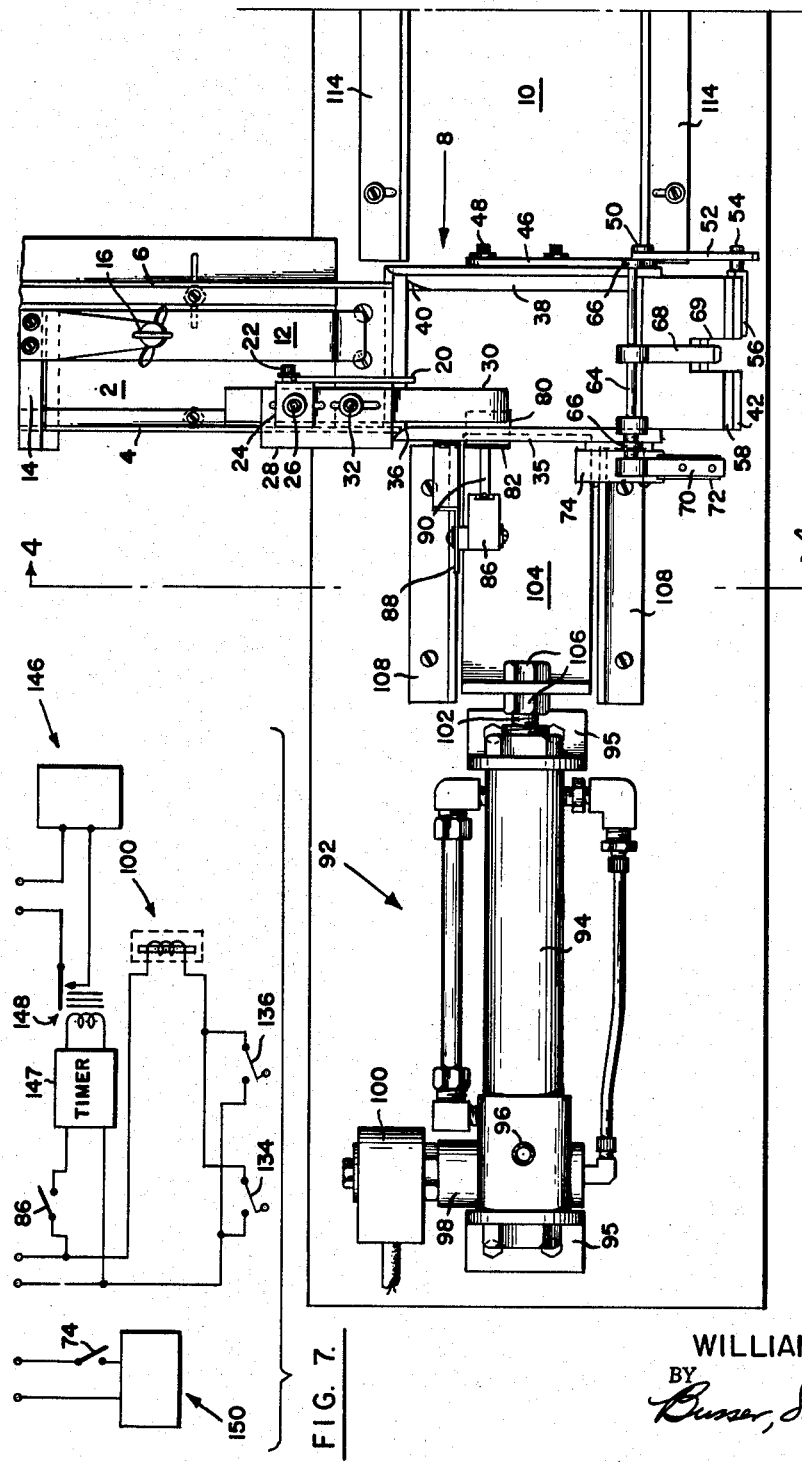
FIGURE 3 is a plan view of the apparatus when inoperative.
FIGURE 7 is a wiring diagram of the electrical controls for the apparatus.

Referring to FIGURE 7, there are illustrated the electrical controls for the aforedescribed machine. The limit switches 134 and 136 are connected in parallel, and in series with each of these switches there is connected the solenoid 100 (FIGURE 3) which controls operation of the penumatic piston and cylinder unit 92. It will be seen, therefore, that when either of the switches 134 and 136 is closed by the action of a pusher plate 116, solenoid 100 will be temporarily energized until that particular normally open switch 134 or 136 is released. As previously explained, upon each energization of the solenoid 100 the valve 98 is operated to effect movement of the ram 104 to the right as viewed in FIGURES 2, 3 and 5. Schematically illustrated at 146 is the drive means for the chain 118. The power circuit or drive means 146 is controlled by switch 86 through operation of a relay 148. The opening or closing of switch 86 would normally result in instantaneous operation of relay 148, though in the illustrated circuit this is subject to control by a timer 147. Timers such as 147 are conventional, being wired into the circuit in essentailly the same manner as a time delay relay, and having a similar function. What is involved essentially is the occurrence of a time delay between the closing of switch 86 and the energization of relay 148 to initiate operation of drive means 146. Timer 147 is adjustable to effect different time delay periods as desired. Further aspects of this operation will be dedescribed hereafter. Also involved in this circuitry is the separate drive means 150 of the packaging apparatus which wraps the individual cigar packs and delivers them up the ramp 2. Drive means 150 is controlled by the normally open switch 74, which, however, is normally held in a closed position by weighted element 72.

The overall operation of the apparatus will now be described. Packs $p$ are pushed successively up the ramp 2 and as each pack projects progressively over the ledge end 21 of the ramp it nevertheless is held in a horizontal position by virtue of the pressures exerted by elements 12, 20 and 30. Each pack, therefore, is projected a considerable distance to the right as viewed in FIGURE 4 and over the hopper 8 so as to strike wall 42 and bounce in the opposite direction as it drops downwardly. It will be understood that the stacking of packs in the hopper flatly cannot be achieved if the packs drop onto their ends, especially if this occurs and a pack does not settle downwardly to a flat position. In normal operation a build-up of a number of packs in the hopper 8 occurs and their presence results in an urging of the member 80 outwardly to close the switch 86. As long as packs are present in hopper 8 to the level of member 80, the switch 86 thereby being held closed, relay 148 is energized. However, by virtue of the time delay interposed by timer 147 upon closing of switch 86, the relay 148 will not be energized until these packs have been present in hopper 8 to the level of member 80 for a period of time corresponding to said time delay. Means 146 drives, as previously explained, the chain 118 carrying pusher plates 116, and if switch 86 is opened by the absence of packs in hopper 8 the resultant opening of the relay 148 will interrupt operation of drive means 146. Assuming, however, that a given supply of packs is present in hopper 8 for a period of time sufficient for timer 147 to close relay 148, wherefore drive means 146 operates, as the pusher plates 116 pass the limit switches 134 and 136 these switches are temporarily closed in succession. Upon the closing first of switch 136 solenoid 100 is energized to effect the operation of ram 104 toward the right in FIGURES 2, 3 and 5. In the illustrated case a pair of packs is displaced from hopper 8, these packs in turn pushing ahead the packs which were previously displaced from the hopper. As the pusher plate 116 passes switch 136 it opens to effect the deenergization of solenoid 100 and the return of ram 104 toward the left in FIGURES 2, 3 and 5. The closing of switch 136 therefore results in the movement of a pair of packs to the position indicated at 152 in FIGURE 2. In the meantime, the pusher plate has displaced from the bottom of hopper 138 a pair of packs, as indicated at 154, actually represented by a cigar-filled pack $p$ and a filler $p'$. Pusher plate 116 subsequently moves into position to close switch 134, resulting again in the energization of solenoid 100 and the movement of ram 104 toward the right in the named figures. This operation of ram 104 results in pushing pairs of packs to both positions indicated at 152 and 156 in FIGURE 2. Continued movement of pusher plate 116 past switch 134 effects withdrawal of ram 104, and pusher plate 116 then comes into contact with the pairs of packs at positions 152 and 156, which packs were grouped by ram 104. In its continuing movement the pusher plate 116 delivers the five cigar packs and the included filler $p'$ to the subsequent stage of wrapping. This cycle of operation is continued as successive pusher plates proceed past the switches 134 in the direction indicated by arrow 139.

The purpose of switch 74 is to interrupt operation of the drive means 150 for the individual cigar packaging apparatus which has not been disclosed. If for some reason the packs in hopper 8 fill up to a level whereat they contact arm 68, it is desirable to cut off operation of the preceding wrapping operation until a particular condition is corrected. Thus the filling of hopper 8 until packs urge arm 68 counterclockwise as viewed in FIGURE 4 results in the release of switch 74, permitting it to move to its normally open position thereby to open the power circuit of drive means 150.

It will be seen from the above description that according to the invention a machine is provided which attains all of the objects set forth in the introduction hereto.

Various departures from the specifically described embodiment of the invention may be made without departing from the scope thereof as defined by the following claims.

What is claimed is:

1. Apparatus for assembling groups of flat packs or the like comprising a hopper having an open top and defined by vertical sides and a bottom surface, means for delivering said packs flatly to said open top, whereby said packs drop into the hopper, a ram reciprocable across said bottom surface through an opening in a side of said hopper, said opening also having a side opening opposite the first-mentioned opening and adapted for the passage of said packs therethrough, a supporting surface extending along the line of reciprocation of said ram and forming a continuation of said bottom surface of the hopper at the side thereof having the second-mentioned opening, conveying means moving transversely across said supporting surface, means for reciprocating said ram to displace successively packs from said hopper, thereby also to effect advancement of packs along said supporting surface and into the path of said conveying means, and means for delivering further packs or the like to said conveying means in advance of movement thereof into oposition to receive packs displaced from said hopper.

2. Apparatus for assembling groups of flat packs or the like comprising a hopper having an open top and defined by vertical sides and a bottom surface, means for delivering said packs flatly to said open top, whereby said packs drop into the hopper, a ram reciprocable across said bottom surface through an opening in a side of said hopper, said opening also having a side opening opposite the first-mentioned opening and adapted for the passage of said packs therethrough, a supporting surface extending along the line of reciprocation of said ram and forming a continuation of said bottom surface of the hopper at the side thereof having the second-mentioned opening, means effecting successive reciprocations of said ram, thereby to displace packs stated from the bottom of said hopper, thereby also to advance said packs along said supporting surface in a row aligned with the reciprocatory movement of said ram, conveying means moving transversely across said row and supporting surface, said conveying means including at least one pusher plate, the end portion of said pusher closer to said hopper being adapted to remove a plurality of stacked packs from said row, and means for depositing further packs in the path of movement of the end portion of said pusher plate farther from said hopper, whereby groups are assembled comprising packs stacked in said hopper and packs supplied from the last-mentioned means.

3. Apparatus according to claim 2, including means responsive to the arrival of said pusher plate at a plurality of points spaced along the path of movement of said pusher plate in advance of engagement thereof with packs in said row to effect movement of said ram, said ram being thereby moved in a direction to displace packs from said hopper in response to the arrival of said pusher plate at each of said points.

4. The apparatus as claimed in claim 3 wherein said means responsive to the arrival of said pusher plate comprise a plurality of switches successively actuated by said pusher plate whereby said ram is actuated at a plurality of times in order to accumulate a plurality of packs in said row prior to the engagement of said pusher plate with said accumulated packs.

5. Apparatus for assembling first and second types of articles into groups comprising means defining a horizontally extending surface, a first hopper supported on said surface of vertically stacking a plurality of articles of said first type, means for continuously supplying articles to the top of said hopper, means for intermittently removing articles of said first type from the bottom of said hopper and accumulating a plurality thereof at a predetermined position on said surface, a second hopper supported on said surface for vertically stacking a plurality of articles of said second type, and means for intermittently removing articles of said second type from the bottom of said second hopper and moving the removed articles of said second type over said surface in a path traversing said predetermined position whereby articles of both types are grouped together at said position.

References Cited by the Examiner

UNITED STATES PATENTS

| 1,750,396 | 3/30 | Evans. |
| 2,032,949 | 2/36 | Hartman _____ 53—159 X |
| 2,576,366 | 11/51 | Smith. |
| 2,682,983 | 7/54 | Ashcroft. |
| 2,840,265 | 6/58 | Noyes _____ 221—13 X |
| 2,846,086 | 8/58 | Norwood. |
| 2,866,562 | 12/58 | Raack. |
| 2,889,073 | 6/59 | Nogle _____ 221—10 |

FOREIGN PATENTS

| 283,244 | 1/28 | Great Britain. |
| 537,300 | 2/57 | Canada. |

HUGO O. SCHULZ, *Primary Examiner.*

ERNEST A. FALLER, JR., *Examiner.*